Sept. 14, 1926.

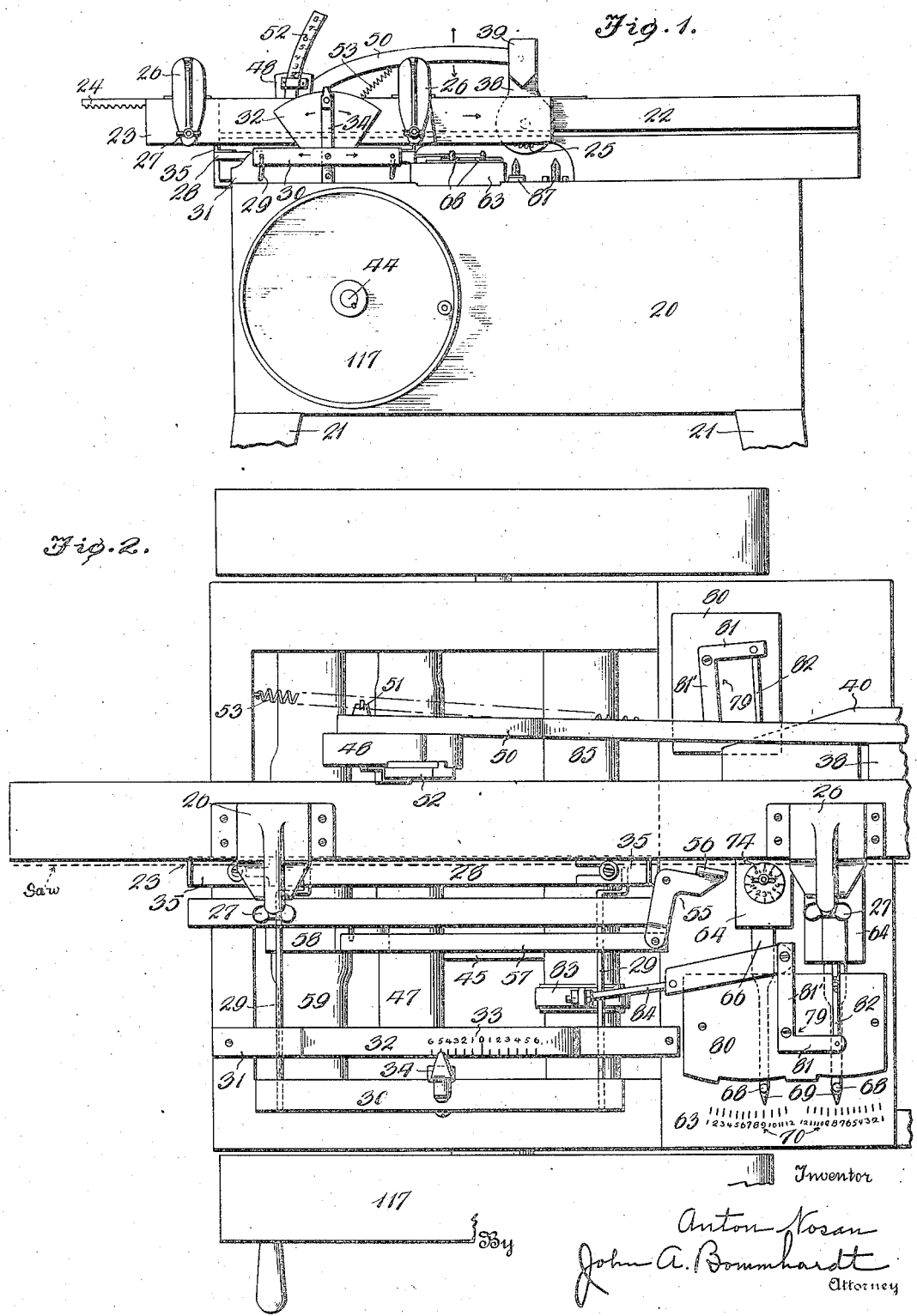

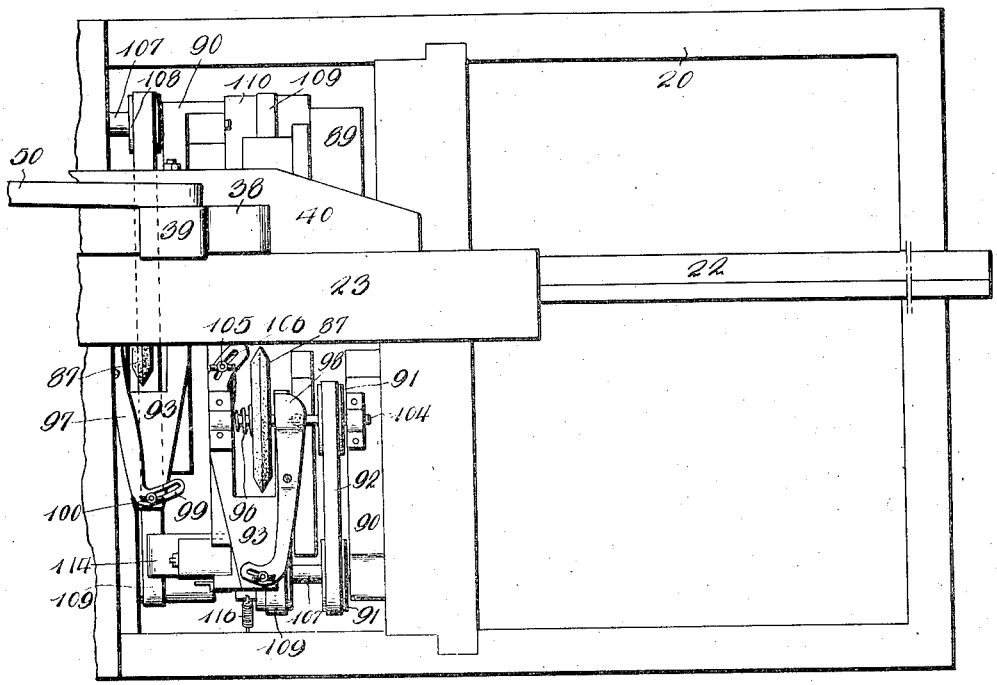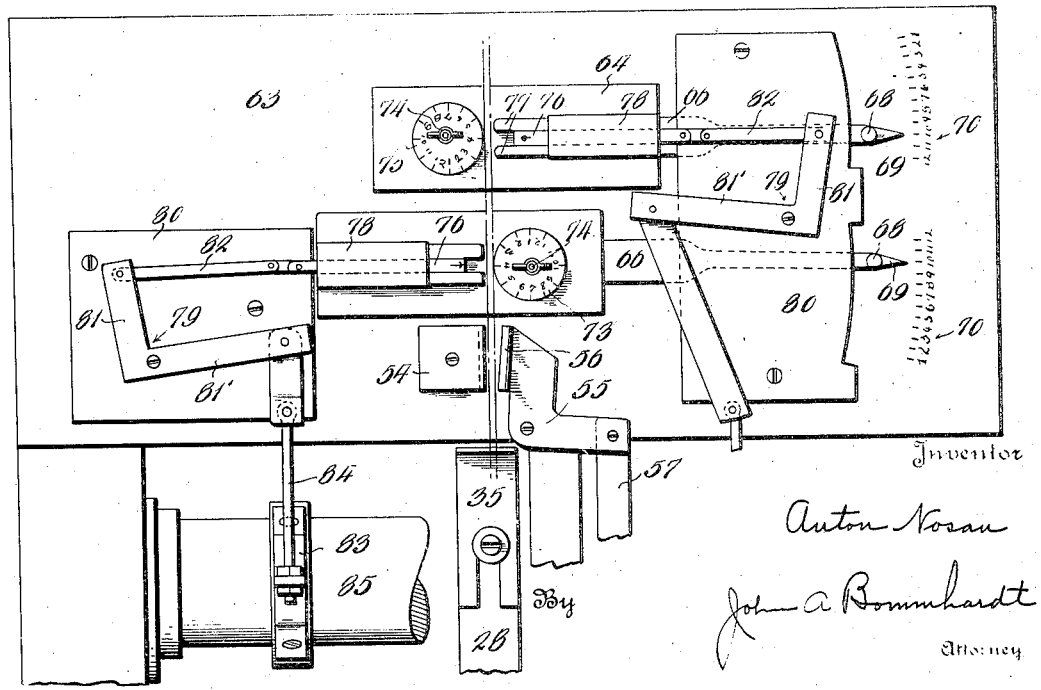

A. NOSAN

SAW TOOTH SETTING AND SHARPENING MACHINE

Filed August 7, 1925   8 Sheets-Sheet 3

1,599,674

Inventor
Anton Nosan
By John A. Bommhardt
Attorney

Sept. 14, 1926.

A. NOSAN 1,599,674

SAW TOOTH SETTING AND SHARPENING MACHINE

Filed August 7, 1925    8 Sheets-Sheet 4

Inventor
Anton Nosan
By John A. Bommhardt
Attorney

Sept. 14, 1926. 1,599,674
A. NOSAN
SAW TOOTH SETTING AND SHARPENING MACHINE
Filed August 7, 1925  8 Sheets-Sheet 6
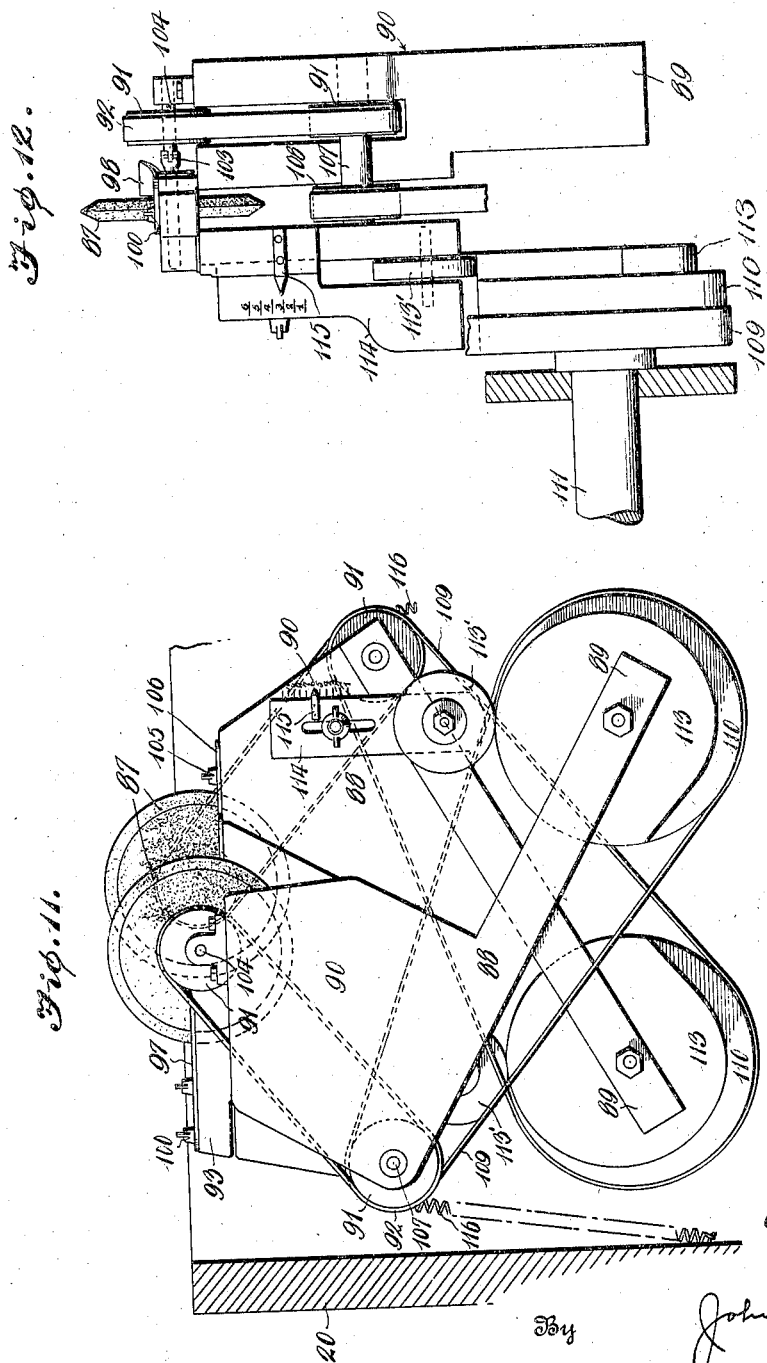

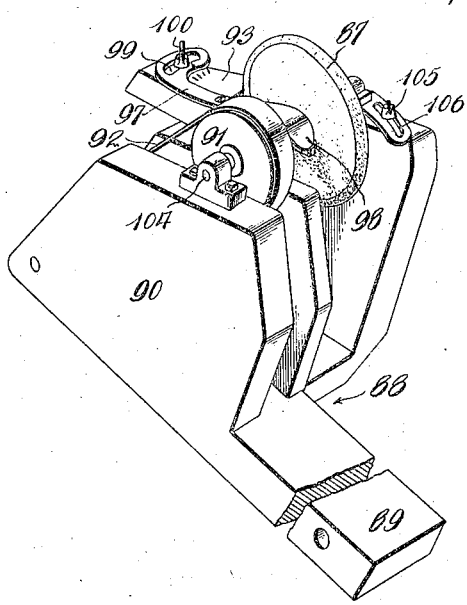
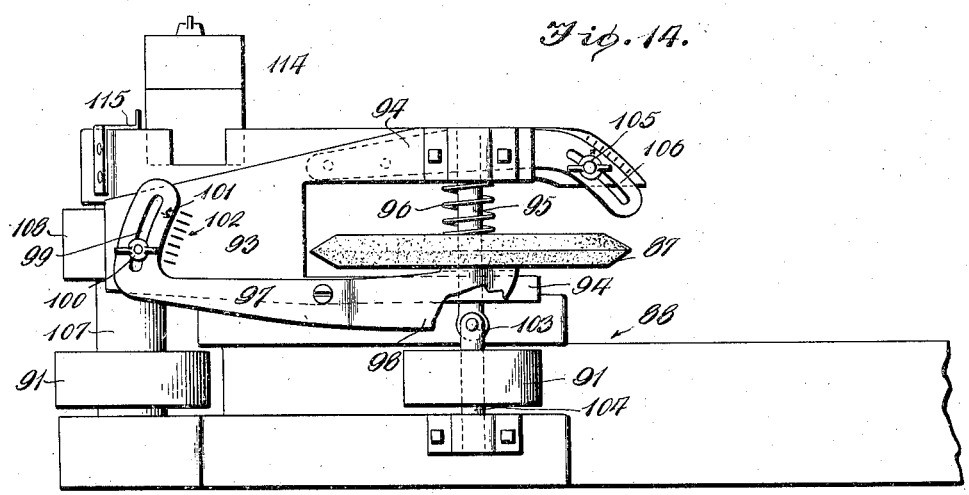

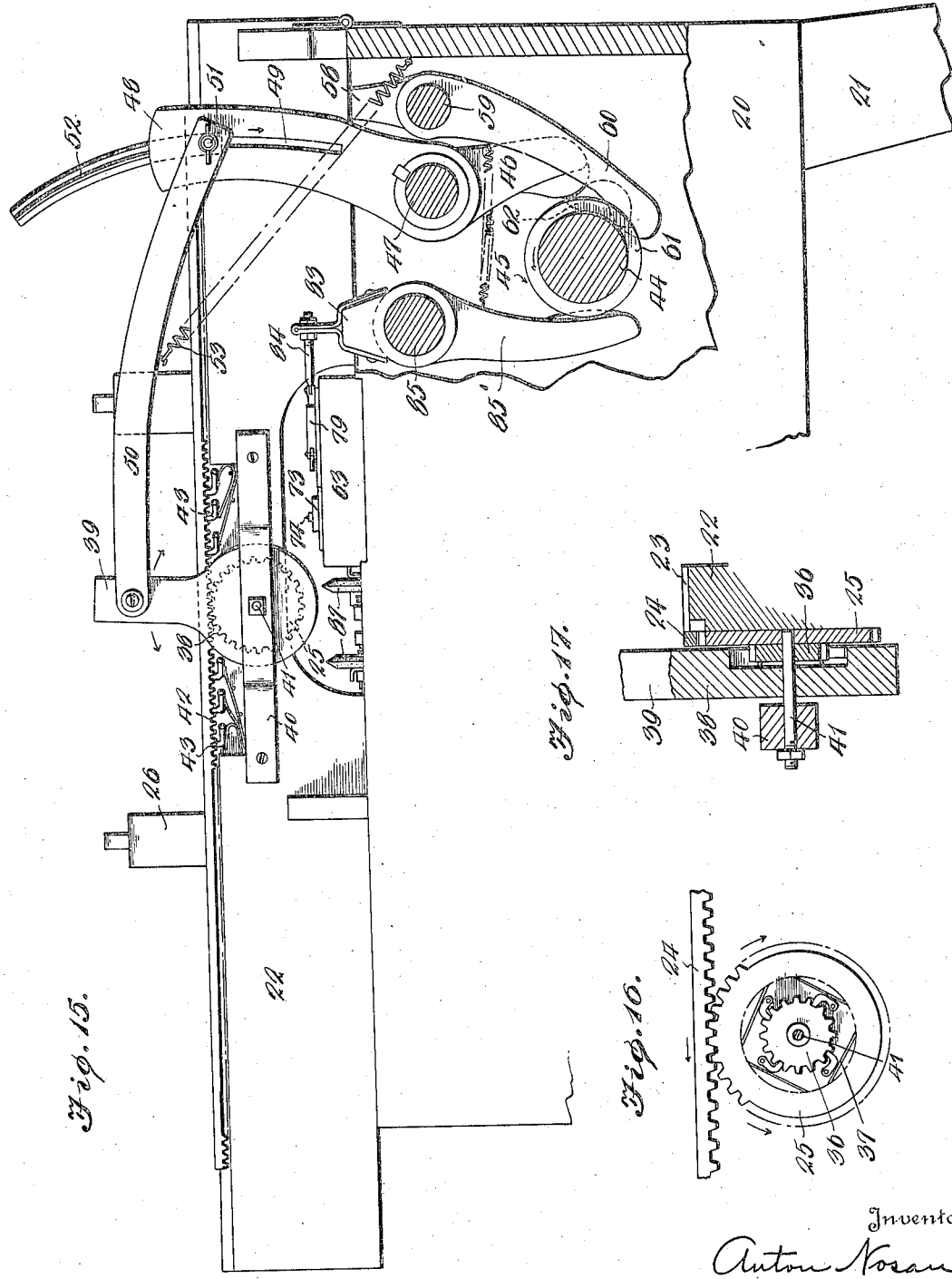

Patented Sept. 14, 1926.

1,599,674

UNITED STATES PATENT OFFICE.

ANTON NOSAN, OF CLEVELAND, OHIO.

SAW-TOOTH SETTING AND SHARPENING MACHINE.

Application filed August 7, 1925. Serial No. 48,769.

The primary object of this invention is to provide means automatically operable for setting the teeth of hand saws and the like at any preferred angle and to sharpen the saw teeth before the saw is removed from the machine.

Another object is to construct a machine wherein necessary adjustment of parts may be readily effected to permit setting and sharpening of the teeth of all standard hand saws, my machine being so constructed that a saw is clamped in a holder at one end and is moved longitudinally in a step by step manner until it reaches the opposite end of the machine at which time complete setting and sharpening of the teeth has been effected.

Another object is to construct a machine of the above character in which is included means for assuring uniform setting and sharpening of the teeth with absolute elimination of guess work on the part of the operator.

In accompanying drawings forming a part of this application:—

Figure 1 is a side elevation of my improved saw tooth setting and sharpening machine;

Figure 2 is a detail top plan view of the feeding end;

Figure 3 is a detail top plan of the discharge end, this figure taken in connection with Figure 2 forming a complete top plan view of the machine;

Figure 6 is an enlarged detail plan view of the tooth setting mechanism, portions of the saw gripping device being shown;

Figure 11 is a cross sectional view taken substantially on the line 11—11 of Figure 10;

Figure 12 is a view taken substantially on the line 12—12 and showing one of the sharpening disk supporting frames;

Figure 13 is a detail perspective view of the sharpening disk carrying frame illustrated in Figure 12;

Figure 14 is an enlarged detail plan view of the elements shown in Figure 13;

Figure 15 is a detail side elevation of the machine taken from the side opposite that shown in Figure 1 and having parts broken away to show the cam and rocker arm arrangement;

Figure 16 is a detail view illustrating the rack and gear device by means of which a step by step movement of the saw and its holder is effected; and Figure 17 is substantially a vertical sectional view of the parts shown in Figure 16, certain other parts being shown in position to clearly illustrate their relation.

Similar characters of reference designate similar parts throughout.

Figure 4:
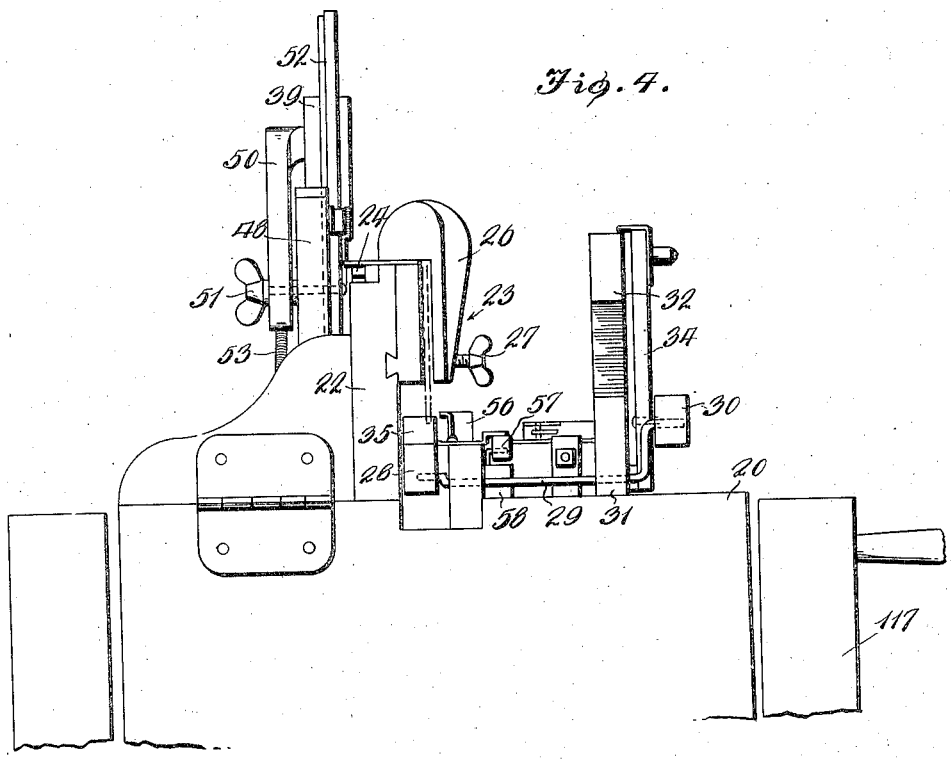
Figure 4 is an elevation of the feeding end.

Preferably, this machine consists of an elongated frame 20 enclosing a set of shafts and supporting on its upper side a longitudinal track carrying bridge on which is slidable in a step by step manner a saw holder which carries the saw longitudinally from one end of the frame to the other at a point in close proximity to one side wall of said bridge. The saw teeth are first engaged by fingers which are adjustable to effect setting of these teeth at any preferred angle. The structure is such that with retraction of the tooth setting fingers the saw is movable forwardly a predetermined distance. After several of these operations the teeth at the outer end of this saw have reached the sharpening disks and are successively sharpened simultaneously with the setting of certain of the teeth nearer the heel of the saw. These operations are continued until the saw has entirely passed the sharpening disks whereupon the clamping devices are loosened to permit removal of the saw from the holder unless it is seen that the saw should be sent through the machine a second time.

The main frame 20 includes a pair of vertical side walls whose ends are connected by means of transverse walls and the whole structure is preferably supported on legs or the like 21. Arranged upon the upper side of this main frame is a vertical longitudinal track carrying bridge 22 which carries a saw holder 23, there being preferably a tongue and groove connection between these two elements to allow separation thereof when necessary and to permit longitudinal sliding of the saw holder upon the bridge. This saw holder or carrier is substantially L-shaped in cross-section and at the outer edge of the upper flange is fixed a rack bar 24 whose depending teeth are engageable with a gear 25 which is operable to effect a sliding movement of the saw carrier. It will be noted that the saw holder or carrier includes a pair of longitudinally spaced jaws or clamps 26 each of which mounts a clamping screw 27 or the like for the purpose of retaining a saw blade in the carrier.

Figure 5:
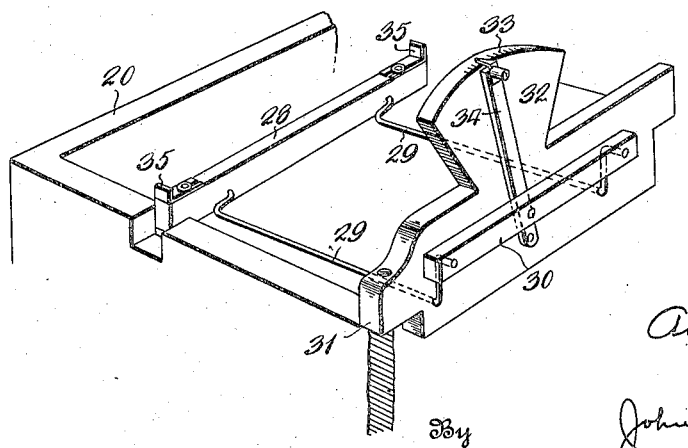
Figure 5 is a detail perspective view of the primary holding and adjusting device which supports the saw for clamping in a holder or carrier proper.

It is well known that hand saws are made up with vari-sized teeth and that these teeth are of different lengths, in consequence of which it is necessary to provide means for accurately fixing the saw in its holder or carrier at the proper elevation with respect to the setting and sharpening mechanisms. For this purpose I provide a primary holder or support shown quite clearly in Figures 1, 2, and 5. This device consists of a vertically and longitudinally shiftable saw tooth engaging member 28 whose movement is effected by means of a pair of transverse crank shafts 29 the outer ends of which are inter-connected and held in fixed relation by means of a connecting bar or member 30 clearly shown in Figure 5. These two crank shafts 29 are oscillatively mounted in a supporting frame 31 on whose upper side is fixed a quadrant 32 having graduations 33 arranged on its periphery. An operating lever 34 is pivoted at its lower end to this supporting member 31 and at a point near this pivot is connected to the intermediate portions to the aforementioned connecting bar 30 and carries at its upper end a handle and a pointer, this last named element being adapted for association with the graduations as indicated in Figure 2. So as to adapt this last member or tooth engaging bar 28 for use with saws of different sizes I arrange a pair of substantially L-shaped fingers 35 as shown in Figure 5 thereby permitting longitudinal adjustment to the different degrees as required. This primary holder or support is as the title indicates, designed to temporarily support the saw at the proper elevation while it is being clamped in the main holder or carrier heretofore described. After the saw has been securely fixed in its main holder or carrier, this last member is lowered and entirely disengaged from the saw.

Intermittent or step by step movement of the saw and holder is effected through the aforementioned rack and gear mechanism, the gear being movable in one direction only, for obvious reasons. This gear 25 is mounted on the inner end of a stub shaft 41 and has fixed to its inner face a relatively small gear 36 whose teeth are engageable with a set of spring pressed pawls 37, these pawls being pivoted to a disk like head 38 which integrally carries a radial arm 39 for connection with an actuating means. With oscillation of the arm and head the pawls 37 engage the relatively small gear 36 and transmit a step by step rotary motion to the large gear 25 which in turn moves the rack bar 24 and saw holder 23 longitudinally on the bridge 22. A supporting bracket 40 serves as an outer bearing for a stub shaft 41 as shown in Figures 15 and 17. In order to assure retention of the rack bar and saw holder at any preferred point and to prevent backward movement thereof, I form a recess 42 in the bridge 22 and mount a set of spring actuated pawls 43 therein as shown in Figure 15.

Oscillation of the disk like head and its radial arm is accomplished through a cam and rocker arm arrangement which includes a main drive shaft 44 having a cam 45 thereon engageable with a finger 46 fixed to a second shaft 47 which is arranged slightly above and out of vertical alinement with the main shaft 44, both of these shafts being arranged transversely of the main frame 20. On this second shaft 47 is a relatively long curved arm 48 having an arcuate slot 49 therein which permits slidable connection between this curved arm and one end of a connector bar 50 whose other end is pivoted to the radial arm 39 by the aforementioned disk like head. A bolt and wing nut or the like element 51 forms the connection between the curved arm 48 and the connector bar 50 and it is obvious that through changing the position of the end of the connector bar with respect to the slot there will be a variance in the throw of this arm and consequently an increase or decrease of the degree of movement of the rack bar 24 and saw holder 23. As shown in Figures 1 and 15 this connector bar 50 is fixed by means of the aforementioned bolt and wing nut connection to a curved gage bar 52 which has graduations thereon by means of which the parts may be relatively fixed or adjusted to accurately advance the saw holder a certain degree as required by the particular size of saw. A coil spring 53 or the like is employed as shown in Figure 15 to assure return of the actuating mechanism to its starting point after each operation.

An auxiliary saw blade gripping or clamping member as shown in Figures 2 and 6 co-acts with the saw holder and a fixed jaw 54 or block to prevent relative movement between the saw blade and the setting and sharpening elements except when desired. This auxiliary clamp member includes a crank arm 55 having an upstanding finger 56 at one end and connected at its other end to an operating rod 57. This rod is pivoted at its other end to a rocker arm 58 which is fixed to a transverse shaft 59 mounting a cam engaging finger 60 which is actuated through engagement with a collar 61 carried by the main shaft, this collar having a relatively short circumferentially extending channel or recess 62 into which the end of the finger 60 rides to permit releasing of the auxiliary clamp while the saw is being advanced.

Figure 7:
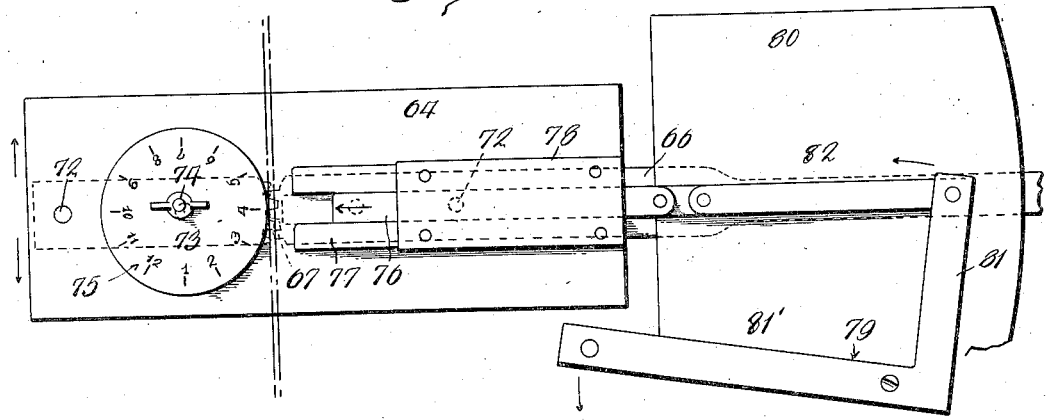
Figure 7 is a detail top plan view of one of the tooth setting mechanisms.
Figure 8:
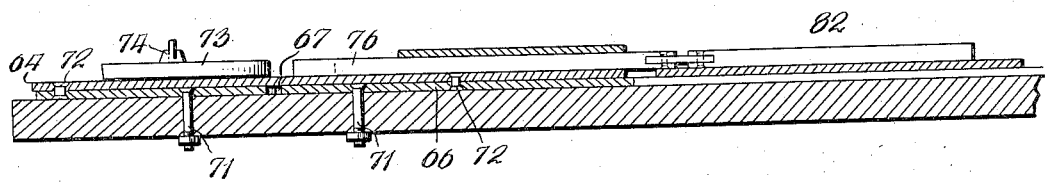
Figure 8 is a vertical longitudinal sectional view of the parts shown in Figure 7, certain of the elements being shown in elevation.
Figure 9:
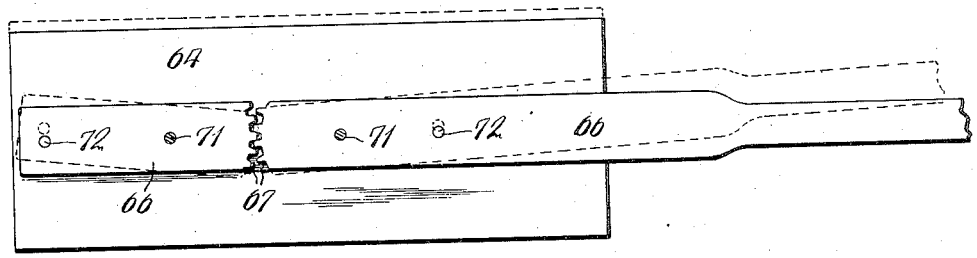
Figure 9 is a bottom plan view showing the tooth setting device and relation of the parts for effecting adjustment of the tooth setting elements.

The tooth setting mechanism is preferably arranged upon a transverse base member 63 carried by the main frame 20 and comprises a pair of longitudinally spaced shiftable plates 64 which carry the setting devices. For the sake of brevity my description of this setting mechanism will be confined to one of the elements since the two are identically formed. A substantially oblong base plate 64 is slidable longitudinally with respect to the main frame 20, the connection between the transverse base member and this plate being in the form of a pair of normally longitudinally alined levers 66 whose adjacent ends are formed with intermeshing gear segments 67. One of these levers 66 is materially longer than the other and carries at its end an operating finger piece 68 and a pointer 69, this pointer being adapted for association with graduations 70 whose function will be hereinafter brought out. These levers 66 are pivoted to the transverse base member 63 by means of bolts 71 or the like as shown in Figure 8 and at points spaced outwardly from these bolts are pivoted to the oblong plate 64 by means of rivets or the like 72. By reference to Figure 9 it will be seen that with movement of the relatively long lever, shifting of the blade to the dotted line position and to degrees other than that indicated by the dotted lines may be readily effected. Adjustably mounted upon the base plate near one end thereof is a disk like anvil 73 which is eccentrically connected to the plate by means of a bolt or wing nut or the like device 74 and carries upon its upper face near the periphery a set of graduations and characters 75 which co-act with others included in this machine to permit accurate setting of the devices. A hammer or setting finger 76 is slidable longitudinally of this base plate between a pair of ribs or guide members 77, this hammer being held between the guide members by means of a cover plate 78 as shown in Figures 7 and 8. A bell crank 79 is pivoted to an auxiliary plate 80 carried by the transverse base member and has one arm 81 connected to the hammer or setting finger 76 by means of a link connection 82 as shown. The other arm 81' of the bell crank 79 is connected to a rocker arm 83 by means of a link connection 84 whose structure is clear in Figures 6 and 15. This rocker arm 83 is fixed to a transverse shaft 85 as shown in Figure 15 and is intermittently oscillative through the action of a cam carried by the main shaft and co-acting with a finger or arm 85' fixed to the aforementioned shaft 85. This cam is the same one that actuates the mechanism for advancing the saw and holder and it transmits motion to the tooth setting mechanism. The degree of the angle at which the saw teeth are to be set determines the position of the disk-like heads and the number of teeth per inch is the element which controls the relative adjustment or spacing of the two disks and the setting fingers or hammers. One of the auxiliary supporting plates 80 is arranged near one end and upon the upper side of the transverse base member and partially covers the operating levers 66 as shown in Figure 6. The two operating levers are identically formed and terminate at adjacent the same end of the main base member and are associated with graduations and characters as indicated. With actuation of these hammers or setting fingers 76 the teeth are properly alined or angled as required and with retraction of the hammers the auxiliary saw clamping member is released and the saw is advanced to the sharpening disks, this advance being effected two teeth at a time. A portion of the anvil periphery is angled to permit setting of the teeth at an angle when necessary.

Figure 10:
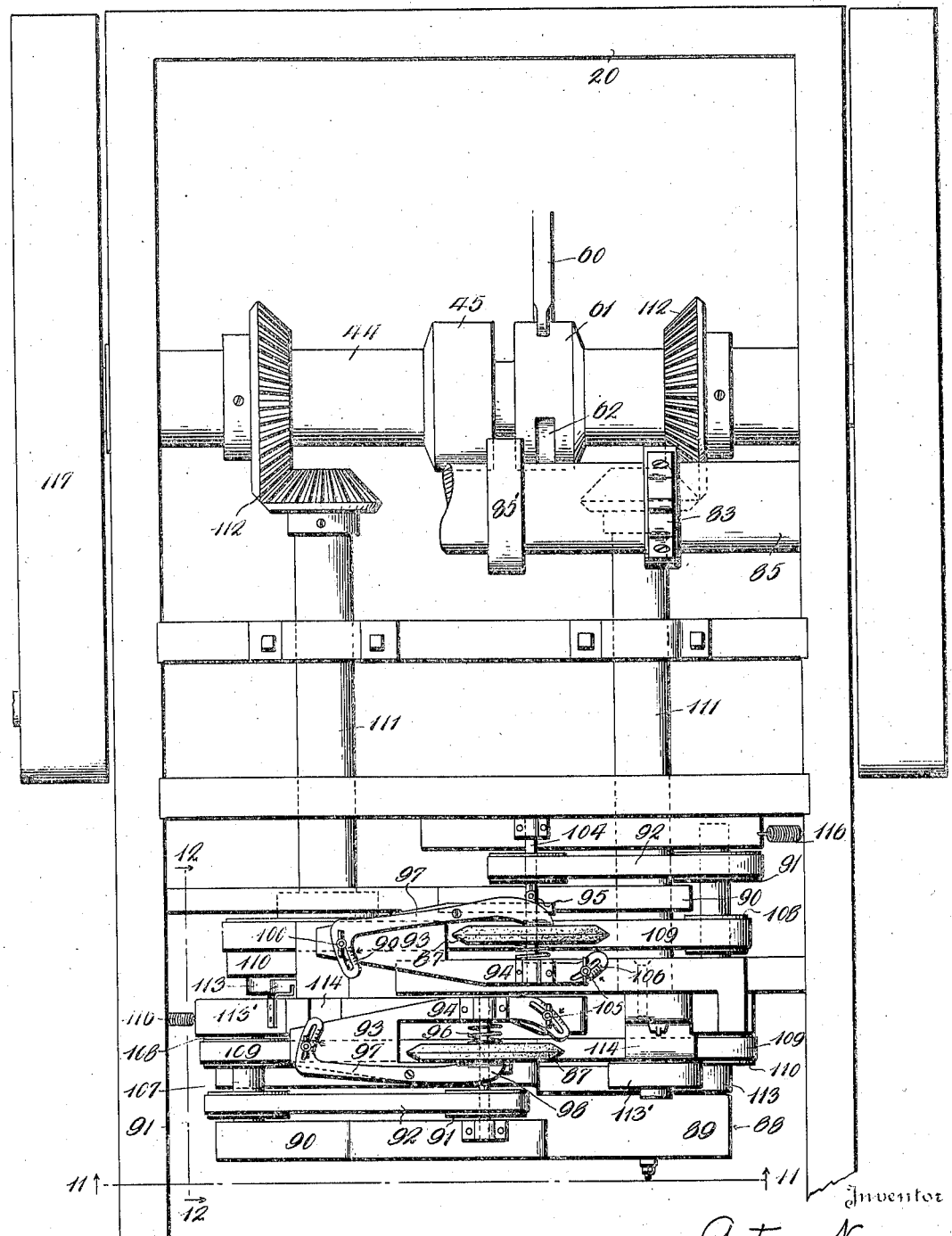
Figure 10 is a plan view showing the drive connection to the tooth sharpening disks, certain of the super-structure being eliminated for the sake of clearness.

The teeth sharpening mechanism comprises a pair of rotatable grinding members 87 formed of emery or the like material, each member having preferably though not necessarily, a substantially V-shaped periphery for engagement between the saw teeth. These members are each supported in substantially L-shaped arms 88 constructed substantially as shown in Figure 13, and being pivoted at their lower outer ends 89 to permit intermittent movement of the grinding members from the path of travel of the saw being set and sharpened. Since the supporting arms and grinding members are identically formed, my description will be confined to one of the structures. One end of the arm terminates in a head 90 having three upstanding bearing supports between two of which is arranged a pair of spaced pulleys 91 over which is trained a driving belt or the like element 92. As shown in Figures 12 and 14 a yoke-like carrier 93 mounts a rotary grinding wheel 87, the two arms 94 of the carrier being arranged to serve as bearings for a stub shaft 95 which supports the grinding member. As shown in Figure 14, this grinding wheel 87 is normally held or retained at one side of the carrier means of a coil spring 96 or the like element and is shiftable on its shaft to compress the spring by means of the shifting lever 97 mounted substantially as illustrated. This lever has a widening end 98 engageable with one face of the grinding wheel 87 and has its other end extended radially and provided with an arcuate slot 99 for the reception of a bolt and wing nut fastener 100 which permits locking of the parts at any preferred point. A pointer 101 and graduations 102 are arranged as shown in Figure 14 to facilitate accurate setting of the wheel, as is obvious. Under certain conditions the wheel must be set at different angles with respect to the path of travel of the saw being set and sharpened and for this purpose I provide a universal joint connection 103 between the stub shaft 95 on which the wheel is mounted and the shaft 104 which supports the adjacent driving pulley 91. The shaft and grinding wheel supported thereby, with the carrier are shiftable with the universal joint as a pivot point and may be locked at any preferred angle by tightening a wing nut 105 engageable with a slotted arm 106 which as shown in Figure 14 is pivotally fixed to one arm of the grinding wheel carrier 93. The lower pulley 91 of the two heretofore mentioned is fixed to one side of a short longitudinal shaft 107 while at the other end a second pulley 108 is fixed and driven by a belt connection 109 from a relatively large pulley 110 arranged at the opposite side of the main frame 20 on a longitudinal shaft 111 to which a rotary movement is transmitted from the main drive shaft through a bevel gear arrangement 112 as shown in Figure 2. A cam 113 is fixed to the shaft and rotates with the large pulley 110, being adapted to engage a vertically adjustable roller 113' carried by one of the substantially L-shaped arms. The roller 113' which engages the cam is mounted on a slotted arm 114 carrying a pointer 115 which may be set opposite any one of the graduations shown in Figures 11 and 12 and through this arrangement the degree of elevation of the grinding wheels may be varied in accordance with the depth of the spaces between the teeth of the saw being sharpened. These cams effect vertical movement of the grinding wheels with their carrying arms, the pivot points of the arm movement being at the longitudinal center of the driving shafts 111. Coil springs 116 are arranged as shown in Figures 10 and 11 and normally exert a downward pull on the free ends of the substantially L-shaped arms so as to clear the path of travel of the saw.

The operation of this machine is as follows:

First the size of the saw is determined either by the numeral or character carried thereby or by measuring to determine the number of teeth per inch and after this has been ascertained the two control levers 66 carried by the tooth setting mechanism are shifted so that the pointers are opposite corresponding numbers of graduations; these numbers indicating the number of teeth per inch on the saw. The disk like anvils 73 are then rotated to the desired point and then clamped in such position by the wing nuts. Next I adjust the cam engaging rollers 113 of the sharpening mechanism to cause intermittent elevation of the wheels to a predetermined degree as may be required by the particular size of the saw. If a rip saw is being set and sharpened, the cutting edges of the teeth must be beveled and consequently I loosen the thumb screws and wing nuts to permit shifting of the grinding wheel and its carrier in an arc with the universal joint as a center. The shifting levers 97 carried by the grinding wheel carrier are moved until the pointers are opposite the numerals which correspond to the ones opposite the pointers on the levers 66 in the tooth setting mechanism. It is understood that the spacing between these two grinding wheels must be exactly the same as that between the two tooth setting devices.

The degree of the step by step movement is then fixed through loosening the wing nut on the bolt which connects the slotted rocker arm shown in Figure 15, and changing the position of the adjacent end of the connector bar with respect to the slotted arm. Graduations on one face of a gage bar as shown in Figure 1 serve as a guide in setting this mechanism. The hand saw whose teeth are to be set and sharpened is next arranged in the saw carrier or holder beneath the spaced clamp members, being supported on the primary holder and before the screws are tightened down, the primary holder is adjusted vertically to properly elevate the saw so the teeth will properly be engaged by the setting devices and sharpening disks. Figure 5 shows this primary holder or support and by reference to Figure 2 it will be seen that shifting of the control lever to bring the pointer to different numbers on the quadrant provides a structure whereby accurate positioning of a saw may be quickly and easily effected. After the saw has been properly clamped in the carrier or holder, the operator rotates manually or in any preferred manner, the drive wheel 117 which is fixed to one end of the main drive shaft with the result that the advancing mechanism is actuated to move the saw and holder forward along the bridge and trackway to the setting and sharpening mechanisms. While the advancing mechanism is returning to its normal position the auxiliary clamping member snugly engages the saw blade and the cams move to actuate the rocker arms and set of bell cranks to move the hammers or tooth setting fingers into engagement with the teeth. During this operation the pair of parallel longitudinal shafts 111 shown in Figure 10 are being driven directly from the main shaft and serve to continually rotate the sharpening disks. The cams 113 on the outer ends of these last named shafts 111 alternately raise and lower the rollers 113' which are vertically adjustable on the sharpening disk carriers and the movement is so timed as to effect perfect co-action between the tooth setting mechanism and disks.

With this machine, saws may be accurately and rapidly set and sharpened by comparatively inexperienced persons, it being merely necessary to determine the size of the saw and then set the various levers and parts as previously set forth.

Obviously, the structure heretofore set out may be varied in many ways and such variance as may fall within the scope of the appended claims, I consider within the spirit of my invention.

I claim:—

1. In a saw tooth setting and sharpening machine, the combination of a tooth setting device, a tooth sharpening device, a saw carrier movable over said devices and having clamps to hold a saw with its teeth presented downwardly toward said devices, means for effecting a step by step movement of the saw carrier over the setting and sharpening devices, and a common means for intermittently and simultaneously actuating and shifting the setting and sharpening devices clear of the path of travel of a saw clamped in the carrier.

2. In a saw tooth setting and sharpening machine, the combination of a main frame, a bridge upon the frame, a saw carrier slidably arranged on the bridge and having clamps to hold a saw with its teeth presented downwardly toward the frame, means for effecting step by step movement of the carrier on the bridge, devices for varying the degree of the step by step movement, mechanism under the bridge for treating the teeth of a saw fixed in said carrier, and a common drive means for effecting the step by step movement, operation of the tooth treating mechanism and intermittent retraction of the tooth treating mechanism from the path of travel of a saw.

3. In a saw tooth setting and sharpening machine, the combination of a main frame, a bridge upon the frame, a saw carrier slidably arranged on the bridge and having clamps to hold a saw with its teeth presented downwardly toward the frame, means for effecting step by step movement of the carrier on the bridge, devices for varying the degree of the step by step movement, a vertically adjustable primary and temporary saw holder; mechanism under the bridge for treating the teeth of a saw fixed in said carrier, and a common drive means for effecting the step by step movement, operation of the tooth treating mechanism and intermittent retraction of the tooth treating mechanism from the path of travel of a saw.

4. In a saw tooth setting and sharpening machine, the combination of a main frame, a bridge thereon, a saw carrier slidable on the bridge in a step by step manner and having clamps to hold a saw with its teeth presented downwardly toward the frame; a tooth setting mechanism comprising a relatively stationary anvil, a reciprocable hammer or setting finger co-acting with the anvil, a drive shaft, a rocker arm, bell crank and link connection between the rocker arm and hammer; a tooth sharpening mechanism, and a common driving means for the tooth setting and sharpening mechanisms and the saw carrier.

5. In a saw tooth setting and sharpening machine, the combination of a main frame, a bridge thereon, a saw carrier slidable on the bridge in a step by step manner; a tooth setting mechanism comprising a relatively stationary anvil, a reciprocable hammer or setting finger co-acting with the anvil, a drive shaft, a rocker arm, bell crank and link connection between the rocker arm and hammer of said finger; a shiftable plate supporting the anvil and hammer, lever means for shifting the plate longitudinally of the path of travel of the saw carrier, means for intermittently actuating the hammer; a tooth sharpening mechanism, and common means for actuating the setting and sharpening mechanism and the saw carrier.

6. In a saw tooth setting and sharpening machine, the combination of a main frame, a bridge thereon, a saw carrier slidable on the bridge in a step by step manner; a tooth setting mechanism including a pair of transverse parallel plates, lever means for shifting the plates toward and from one another along the path of travel of a saw, disk-like fixed anvils carried by the plates, reciprocable hammers or setting fingers arranged for coaction with the anvils, means for effecting intermittent reciprocation of the hammers; tooth sharpening mechanism arranged adjacent the setting devices, and a common means for actuating the setting and sharpening devices and the saw carrier.

7. In a saw tooth setting and sharpening machine, the combination of a main frame, a bridge thereon, a saw carrier movable in a step by step manner upon said bridge and having clamps to hold a saw with its teeth presented downwardly toward the frame, tooth setting mechanism, tooth sharpening mechanism comprising a pivoted supporting arm, a rotary grinding member carried by said arm, cam means for raising and lowering the grinding member with respect to the saw carrier, and a common means for moving the saw carrier and actuating the tooth setting and sharpening mechanism, said mechanisms being located under the bridge.

8. In a saw tooth setting and sharpening machine, the combination of a main frame, a bridge thereon, a saw carrier movable in a step by step manner upon said bridge and having clamps to hold a saw with its teeth presented downwardly toward the frame, tooth setting mechanism, tooth sharpening mechanism comprising a pivoted supporting arm, a rotary grinding member carried by the arm, adjustable cam and roller devices for variably and intermittently raising and lowering rotary grinding members with respect to the saw carrier, and a common means for actuating the saw carrier, and the tooth setting and sharpening devices, said devices being located under the bridge.

9. In a saw tooth setting and sharpening machine, the combination of a main frame, a bridge thereon, a saw carrier movable in a step by step manner upon said bridge and having clamps to hold a saw with its teeth presented downwardly toward the frame; tooth setting mechanism; tooth sharpening mechanism comprising a pivoted supporting arm, a rotary grinding member carried by the arm, lever means for shifting and varying the angle of the grinding member with respect to the path of travel of the saw carrier, cam and roller devices for intermittently raising and lowering the grinding member with respect to the saw carrier; and a common means for actuating the carrier and tooth setting and sharpening devices, said devices being located under the bridge.

10. In a saw tooth setting and sharpening machine, the combination of a main frame, a bridge thereon, a saw carrier movable in a step by step manner upon said bridge; tooth setting mechanism; tooth sharpening mechanism comprising a pair of pivoted supporting arms, a pair of horizontally shiftable carriers arranged upon the free end portions of said arms, rotary grinding members mounted in said carriers, levers for shifting and locking the carriers and grinding members at different angles with respect to the path of travel of the saw carrier, cam and roller devices for intermittently and simultaneously raising and lowering the free ends of the said supporting arms with respect to the saw carrier; and means for actuating the saw carrier and the tooth setting and sharpening mechanisms.

11. In a saw tooth setting and sharpening machine the combination of a main frame, a transverse driving shaft, secondary transverse shafts adjacent the main shaft, co-acting cams and rocker arms carried by the shafts, a bridge carried by the frame at right angles to the shafts, a saw carrier slidable over the bridge and having clamps to hold a saw with its teeth presented downwardly toward the frame, a rack bar fixed to and extending longitudinally of the carrier, gear and pawl mechanism engaging the rack bar to move the same in one direction, a relatively long intermittently rockable arm carried by one of said secondary shafts, and connection between the relatively long arm and said gear to effect a step by step movement of the carrier; tooth setting mechanism, tooth sharpening mechanism, and means whereby these last named mechanisms are actuatable from said shafts, said mechanisms being located under the bridge.

12. In a saw tooth setting and sharpening machine, the combination of a main frame, a main drive shaft, a bridge arranged at right angles to the shaft, a saw carrier slidable on the bridge and having clamps to hold a saw with its teeth presented downwardly toward the frame, rack and gear devices for moving the saw carrier, a rocker arm, cam and link mechanism between the shaft and rack and gear devices for effecting a step by step movement of the rack bar and carrier, means for varying the throw of the rocker arm; tooth setting mechanism, tooth sharpening mechanism, and means whereby said shaft will simultaneously actuate these last named mechanisms, said mechanisms being located under the bridge.

13. In a saw tooth setting and sharpening machine, the combination of a main frame, a transverse drive shaft, a set of rocker arm supporting shafts, oscillative by the main shaft, a bridge arranged at right angles to said shafts, a saw carrier slidable on said bridge and having clamps to hold a saw with its teeth presented downwardly toward the frame, rack and gear connection for moving said carrier, an arm associated with the gear, a relatively long arm carried by one of said shafts and having an arcuate slot therein, a connector bar pivoted to the first named arm and having slidable connection in the slot of the second arm to permit variance of the throw of the first arm; tooth setting and sharpening mechanism; and means to permit actuation of these last named mechanisms by said shafts, said mechanisms being located under the bridge.

In testimony whereof, I affix my signature.

ANTON NOSAN.